United States Patent
Hawryluk et al.

[15] 3,675,396
[45] July 11, 1972

[54] GAS PURIFIER UNIT

[72] Inventors: Alexandra S. Hawryluk; John Hawryluk, both of Marlton, N.J.

[73] Assignee: Control Research Products, Inc.

[22] Filed: May 5, 1970

[21] Appl. No.: 34,763

Related U.S. Application Data

[63] Continuation-in-part of Ser. No. 737,206, June 14, 1968, abandoned.

[52] U.S. Cl. .................................. 55/225, 55/229, 55/235, 55/245, 261/79 A, 261/114 JP
[51] Int. Cl. ........................................................ B01d 47/00
[58] Field of Search ............... 55/220, 225, 226, 229, 235, 55/236, 237, 245, 248, 255, 256, 257; 261/79 A, 114 JP, 124

[56] References Cited

UNITED STATES PATENTS

| | | | |
|---|---|---|---|
| 2,234,385 | 3/1941 | Ryner | 55/257 X |
| 3,332,214 | 7/1967 | Huppke | 55/248 X |
| 2,596,106 | 5/1952 | Schneible | 261/79 A |
| 3,105,105 | 9/1963 | Kittel | 261/79 A |

*Primary Examiner*—S. Leon Bashore
*Assistant Examiner*—Robert L. Lindsay, Jr.
*Attorney*—Shlesinger, Arkwright & Garvey

[57] ABSTRACT

A gas purifier unit has a cross-sectionally disposed baffle and gas pocket assembly which supports an upper body of cleansing fluid above it and holds a gas pocket immediately below, the gas pocket being disposed above a lower body of cleansing fluid, and the upper surface of the baffle and gas pocket assembly having closely spaced openings through which angularly disposed streams of gas issue and pass upwardly through the upper body of cleansing liquid, losing impurities in their travel.

11 Claims, 7 Drawing Figures

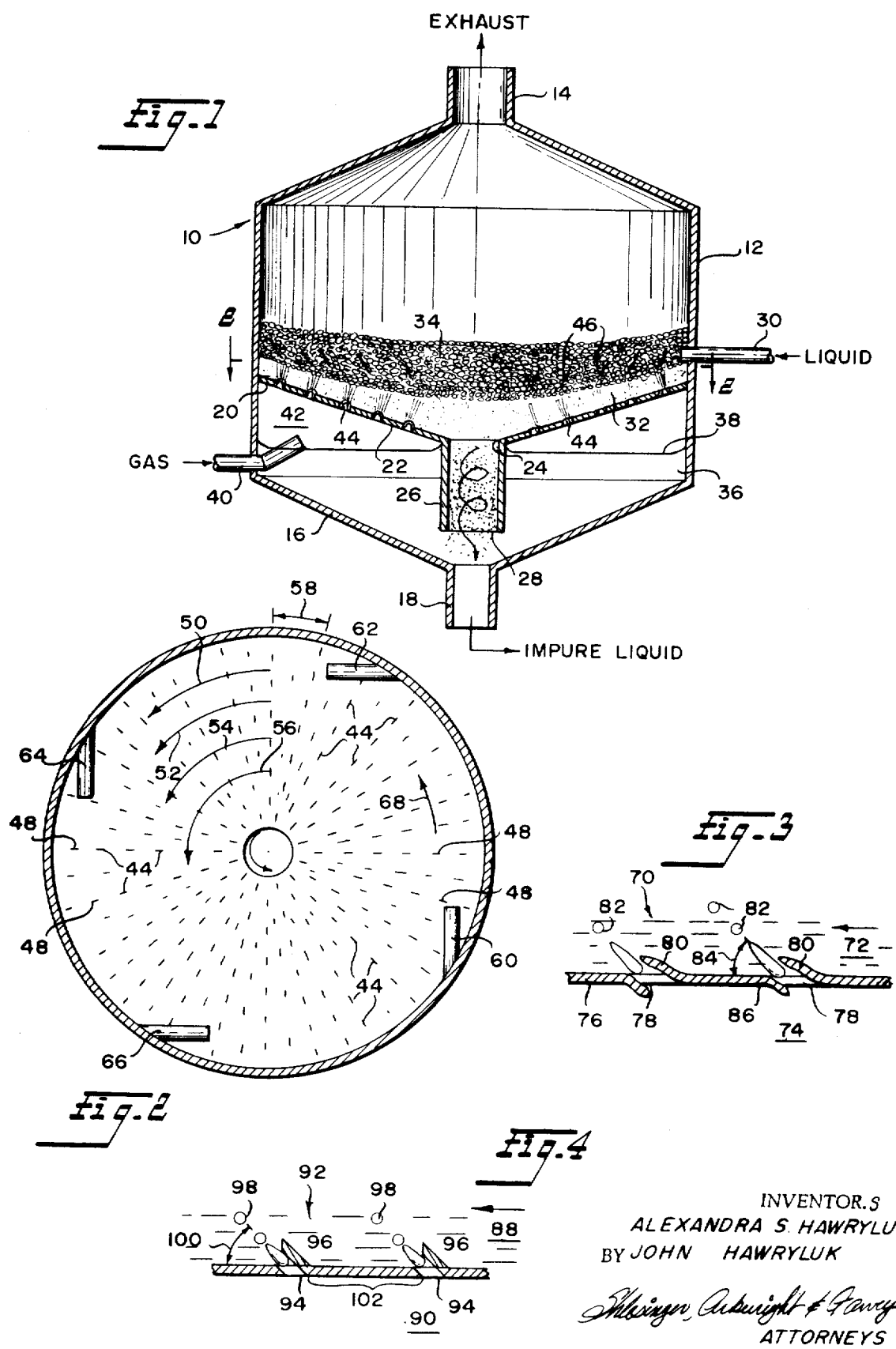

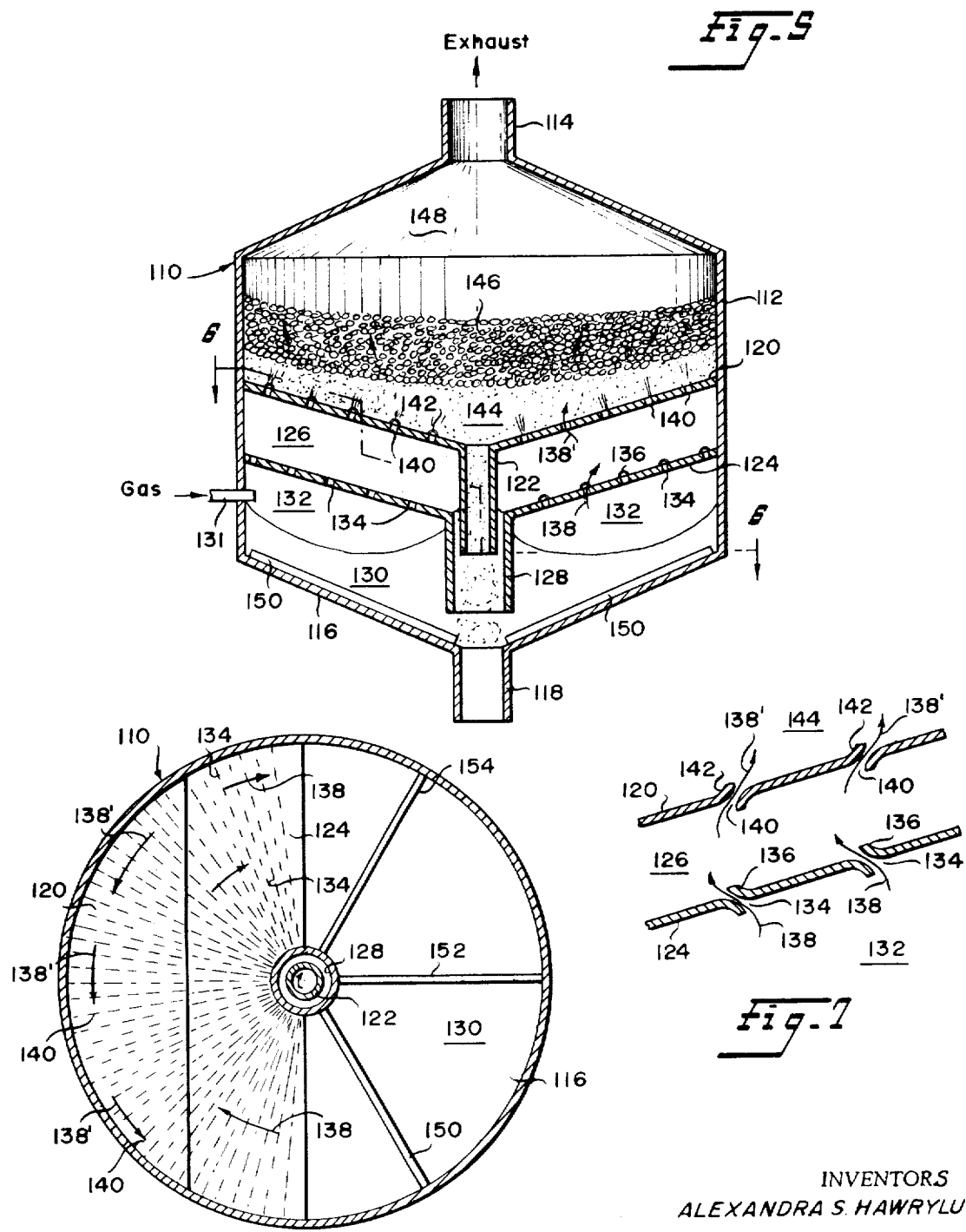

GAS PURIFIER UNIT

This application is a continuation-in-part of Ser. No. 737,206, filed on June 14, 1968 now abandoned, for the invention entitled Gas Purifier Unit.

SUMMARY OF INVENTION

This invention relates to gas purifying, and particularly to scrubbing gases as they pass through a body of cleansing liquid.

Sufficient cleansing of gases containing impurities, such as stack gases has heretofore been economically impractical, since large complex cleaning apparatus have been required.

This invention overcomes these drawbacks by providing a low-cost gas purifying unit which is extremely effective in removing pollutants and odor contained in gases, is simple in design, has low maintainence, and operates on cleansing liquid that can be recycled.

Accordingly, it is a principal object of this invention to provide an economical and efficient gas purifying unit.

It is a further object of this invention to provide a steady flow continually operated gas purifying unit which can purify large volumes of gases.

It is another object of this invention to provide a low-cost gas purifying unit which is simple in design.

It is still further object of this invention to provide a gas purifying unit which is virtually maintainence free, and has no moving parts.

It is still further object of this invention to provide an efficient gas purifying unit wherein the purifying liquid and the impure gases are efficiently intermingled.

It is a still further object of this invention to provide a simple, economical gas purifying unit of compact design which can readily be used for many different gas cleaning applications.

It is a further and general object of this invention to provide an efficient and economical approach to the air pollution problem.

These and further objects and advantages will become apparent from the drawings, the following description, and the claims which set forth the preferred embodiments thereof.

DESCRIPTION OF THE DRAWINGS

FIG. 1 is a sectional view of the gas purifier unit in operation.

FIG. 2 is a horizontal section along line 2—2 of FIG. 1, illustrating the movement of the gas and liquid within the unit.

FIG. 3 is a sectional view of a portion of perforated baffle plate having struck out deflector sections.

FIG. 4 is a sectional view of a portion of a second perforate plate construction showing in detail the construction of gas discharge openings.

FIG. 5 is a sectional view of a gas purifier unit used for removing extremely fine particles in a gas.

FIG. 6 is a cross-sectional view of the unit of FIGURE taken along the lines 6—6.

FIG. 7 is an enlarged sectional view of a portion of the baffle structure showing the directional gas circulation therethrough.

DESCRIPTION

Referring to FIG. 1, the gas purifier unit is generally indicated at 10. It provides a unit wherein intermixing of the cleansing fluids and the gas to be purified is conducted on a continuous basis and wherein the stream of incoming impure gases is broken up into a plurality of fine gas bubble streams which pass upwardly through a body of cleansing liquid.

The gas purifier housing is preferably made of stainless steel and has a central cylindrical section 12, an exhaust outlet 14 at the top thereof, and a lower waste receiving section 16 at the center of which a cylindrical drain 18 is disposed.

A baffle and air-pocket unit generally designated at 20 and including a tapered conically-shaped perforate plate 22. The periphery of the plate is integral with the interior surface of the central purifier section 12. The perforate plate 22 has a central discharge drain opening 24. A cylindrically shaped liquid drain conduit 26 is connected to the perforate plate 22 and extends downwardly to form a baffle and exhaust conduit, with its lower end portion 28 disposed slightly above the gas purifier drain conduit 18.

A cleaning liquid input line 30 supplies cleansing fluid to the interior of the gas purifier central section at a point above the baffle and air-pocket unit 20. The liquid is supplied at such a rate that a body of cleansing liquid, in most cases water, builds up in the central section 12 above the perforate plate 22 to the desired level and the gas bubbles then build up a foam-like body 34 above the liquid. The cleansing liquid flows down through the drain cylinder 26 and into the lower gas purifier section 16 to build up a lower section of cleansing fluid 36 beneath the baffle and air pocket assembly 20 to a level shown at 38.

Simultaneously with the supply of cleansing liquid through the input line 30 the gas to be purified is supplied under pressure through gas input line 40 which enters the central section 12 of the gas purifier housing 10 below the perforate baffle plate 22 of the baffle and air-pocket assembly 20. This gas is supplied under pressure and builds up an air-pocket 42 which presses downwardly on the cleansing liquid surface 38, and upwardly against the lower portion of the perforate baffle plate 22. The baffle plate 22 has a large number of small gas discharge openings 44 through which the gas passes forming a plurality of rising streams of gas bubbles 44 in the body of cleansing liquid 32.

The spacing and size of the perforate openings, as well as the volume and pressure of gas passing through the openings hold the body of cleansing liquid 32 above the perforate plate 22.

In FIG. 2, which shows a sectional view of the central section 12 of the purifier unit looking downwardly at the perforate plate 22, the general position of the openings in staggered circular rows is illustrated, together with the line of travel of the gas bubble streams 50, 52, 54, and 56. It will be noted that the gas bubble streams closer to the periphery of the perforated baffle plate 22 do not travel any greater distance through the body of cleansing liquid than those closer to the central drain section 26.

Liquid may be supplied through one opening or nozzle, or through a plurality of nozzles, the plural nozzle construction being shown in FIG. 2. In this drawing tangentially disposed cleansing liquid input nozzles 60, 62, 64, and 66 supply liquid to the interior of the housing 10 above the perforate baffle plate 22 in a counter-clockwise direction to produce a swirl of liquid so that the whole body of cleansing fluid 32 is moving in a counter-clockwise direction, and draining at its central portion down through the opening 24 of perforate baffle plate 22.

In FIG. 3 a detailed perforate baffle plate generally designated 70 is illustrated. The cleansing liquid 72 and the gas pocket 74 are shown on either side of the baffle plate 76. The perforate openings 78 have upwardly struck deflector pieces 80 over which the cleansing liquid body 72 moves, while a stream of bubbles 82 issues from the opening in a line whose angle of inclination 84 is determined by the inclination of the deflector plate 80, the pressure of the gas pocket 74 and the movement of the cleansing liquid body 72. By adjusting the hole size and the distance between adjacent openings 78, the amount of gas passed through the liquid can be controlled.

FIG. 4 shows a second type of perforate plate construction which is preferably used with larger type units having thicker perforate plate members. The body of cleansing liquid 88 is disposed above and the gas pocket 90 disposed below the thick perforate plate generally indicated at 92. A plurality of angularly drilled passageways 94 are drilled through the plate all in the same direction and substantially equal angular inclination. Deflecting pieces 96 are welded or otherwise fixed to the plate adjacent a corresponding opening 94 to provide deflection and additional angular direction to the streams of gas bubbles 98 issuing from the openings 94. The angular inclination of the passageways 94 and the underside of the deflector plates 96 is selected to give the desired angular inclination 100 of the gas bubble stream as it passes into the body of cleansing liquid 88.

The body of cleansing liquid 32 should be in continual movement around the central discharge opening 24 of the perforate plate 22. The impelling force of the gas bubble streams on the liquid is relied on for this purpose. The tangential direction of the input liquid is an incidental factor in such movement, since in many instances liquid is not continuously supplied to the unit.

Referring to FIG. 5, a modified gas purifier unit for removal of very fine particle impurities from gases is shown in cross-section. The unit 110 has a central housing 112, with an upper exhaust outlet 114. A lower section 116 is connected to a liquid drain 118.

In this modification a double perforate plate assembly is used to provide an intermediate annular swirl chamber for the gases leaving the gas pocket.

A gas plate 120 similar in construction to the plate 20 of FIG. 1 is disposed at a slightly higher position within the central sectional 112 of the gas purifier unit 110. This plate has a central drain cylinder 122. A lower perforate baffle plate 124 is spaced below the upper perforate plate to provide an annular gas swirl mixing space 126 between the two plates. The perforate plate is similar in construction to the perforate plate of FIG. 1, and has a central drain cylinder 128 which extends down into the lower cleansing liquid 130.

Impure gas is supplied to the interior of the purifier unit 110 below the lower perforate baffle plate 124 through supply line 131, creating an annular gas pocket 132 below the lower baffle plate 124.

The gas presses downwardly against the upper surface of the lower body of cleansing fluid 30 and a portion thereof passes upwardly through the openings 134 in the lower baffle plate 124 to also occupy the space 126 between the two perforate baffle plates. The gas is deflected to impart a uniform angular direction to all gases entering the chamber 126. The deflector units 136 shown on the right side of the figure and further indicated in FIG. 7 are instrumental in imparting the desired direction to the gases as they leave the gas pocket 132. The pressure of the gas in the space 126 is sufficient to keep the cleansing liquid out of the cavity and at a height approximately near the top of the annular drain cylinder 128 for perforate plate 124. During operation the water does in many cases accumulate a slight layer above the perforate plate 124, but preferably the depth of this water is kept to a very low level.

FIGS. 6 and 7 illustrate the directional flow of the gases as they pass through the two perforate baffle plates. FIG. 7 which shows a section of the two baffle plates, illustrates the upward flow of the gases and their change in direction as they pass through the baffle structure of FIG. 5.

The line of gas travel is shown at 138 as it passes through the opening 134 of the lower baffle plate 124 and upwardly into the open space 126. The general direction of flow of all of the gases through the plate would be in the same direction so that the entire body of gas contained in the space 126 between the perforated plates 124 and 120 moves in the same direction. The gas leaving the space 126 passes through the openings 140 and is shown as travelling in the general direction 138', this direction being opposite to the direction of travel 138 of the gas as it passed upwardly into the mixture gas space 126. The direction of travel of the gases passing through the multiple openings 140 in the upper perforate and baffle plate 120 pass upwardly through all of the openings in the same direction and into the body of cleansing liquid 144.

The pressures of the gas supplied to the lower gas pocket 132 must be great enough to allow for pressure drops through both of the perforated plates 120 and 124 while providing sufficient force and pressure to maintain the desired level of cleansing liquid 144 above the upper perforate plate 120. The gas pressure necessary to maintain the cleansing liquid above the upper perforate plate depends upon the velocity of the gas passing through the openings and size thereof. However, the gas pressure as it passes through the openings in the upper perforate plate must be at least the equal of the pressure of the liquid at the upper perforate plate.

Deflection of the gases to the desired direction is accomplished by use of the deflector pieces 136 and 142 shown in FIG. 7 and also in less detail in FIG. 5. It will be noted that the depth of the upper body of cleansing liquid 144 is substantially less than the depth of the foam and gas bubble section 146 which is disposed immediately above it. The height of this foam section can be varied by changing either the gas pressure or the size of the holes through which the gas passes. It has been found that smaller holes create a thicker foam and bubble section. In some applications it is desirable to have a large foam and bubble section. The holes are approximately one-eighth inch in diameter.

The gas is drawn out of the purified gas chamber section 148 and upwardly through the gas exhaust vent 114 at the top of the unit.

It is desirable to keep the upper body of cleansing liquid 144 in a continual state of movement induced primarily by the streams of gas bubbles. However, the lower body of cleansing fluid should be kept relatively still. A plurality of radially extending stabilizer blades 150, 152 and 154 have been found to be effective in retarding movement of the lower body of cleansing liquid. These are essentially upright metal pieces which are integrally fixed to the inside lower surface of the inner lower section 116 of the purifier unit 110.

OPERATION

As mentioned above, the gas purifying operation is a continuous process wherein exhaust gases are continuously supplied to the unit. Cleansing liquid is supplied to the unit and withdrawn therefrom when a cleaner body of liquid becomes necessary. A continuous process, providing for continuous cleaning liquid recirculation with intermediate filtering of the liquid before it is returned to the upper body of cleansing liquid can also be used in this process.

Cleansing liquid is supplied through the supply line and supply nozzles 30 to build up the body of cleansing fluid 32 above the perforate plate 22. The height of this body of liquid can be from one-half inch to six inches, and the entire body moves in a counter-clockwise direction as indicated by the arrow 68. The entire body of liquid 32 is continually agitated by the passage of the streams of gas particles 46 upwardly therethrough, so that the body of liquid resembles a boiling fluid, with the upper portion 34 thereof in continuous and violent agitation from the plural streams of gas bubbles which are forced upwardly therethrough.

The counter-clockwise movement of the entire body can be assisted by the tangential displacement of the nozzles 60, 62, 64, and 66 through which the cleansing fluid can be introduced. However, this is not essential, since the directional movement of the plural streams of gas in counter-clockwise direction as they issue from the openings 44 in the perforated baffle plate 22 impart a counter-clockwise movement to the fluid. Counter-clockwise movement of the fluid gives slightly more favorable results where a continuous process is used, since the in the Northern Hemisphere liquid drains by gravity downward in a counter-clockwise direction, and it is helpful, but not essential, when the upper body of cleansing liquid moves in a counter-clockwise direction.

The gas is supplied under pressure sufficient to form the gas pocket 42 which presses downwardly on the surface 38 of the lower body of cleansing fluid 36, and supplies a gas reservoir from which solid heavy particles drop down into the lower body of cleansing fluid 36. The impure gases containing smaller particles or noxious fumes are forced upwardly through the perforated openings to form a plurality of high pressure continuous streams of bubbles which flow upwardly and in a counter-clockwise direction through the fluid, reacting with the cleansing fluid during such passage. The gases then emerge from the upper surface 34 of the cleansing fluid and are drawn out through the exhaust 14 of the purifier unit.

The impure liquid is drawn downwardly from the upper body of cleansing fluid through the liquid drain cylinder 26 where it passes downwardly mixing with the lower body of cleansing liquid 36 and is removed through the purifier unit drainpipe 18. Cleansing fluid may be removed at a continuous or an intermittent rate. Preferably, cleansing liquid drain cylinder 26 extends downwardly below the perforated plate 22 a substantial distance so that its end portion 28 is near the bottom of the lower body of cleansing liquid 36 and close to the outlet for the impure liquid drain 18. Elongated cylinder 26 thereby tends to concentrate the impurities in the immediate area of the drain.

The swirling action of the upper body of cleansing liquid 32 tends to create a vortex effect, together with the drainage of the liquid, which tends to draw the impurities toward the center and to the drain opening 24 in the perforated plate 22. The downwardly sloped inclination of the perforated plate also assists in the accumulation of solid particles toward the center of the perforated plate and close to the vortex created adjacent to the drain opening 24.

The impure liquid can be filtered or chemically treated, and then returned to the gas purifier unit 10 to provide a closed cycle process.

In many instances, the cleansing liquid may be water. However, chemical cleansing liquids or solutions are also used where it is desired to remove gases such as carbon monoxide, sulphur and constituents of stack gases. In these instances, there is a chemical reaction, in some instances forming a precipitate, which falls to the bottom of the upper cleansing body of liquid and passes downwardly through the liquid drain cylinder 26.

The cleansing liquid in most instances is water, but other types of liquids, have been used. For example, sulphur dioxide has been removed from gases with a 97 percent efficiency using a liquid containing caustic soda. It has been found that it is preferable to supply fresh cleansing liquid toward the top of the bath, since there is more of a chemical reaction toward the top rather than near the bottom of the fluid. it is not essential that the cleansing liquid be supplied in a tangential direction, since it has been found that the swirl of the cleansing liquid bath can be imparted by the gas bubble streams.

The gas bubble streams act to push the cleansing liquid in a circular motion. The preferred angular inclination 4 of the bubble stream with respect to the plate is usually about 45°. However, this will depend upon the depth of the liquid and its density and other such factors.

The circular rows of perforated holes are usually staggered with respect to each other, and the holes are usually spaced from each other at least twice their diameter.

The second modification of this invention shown in FIGS. 5 through 7 is used primarily for purifying gases having particles of extremely fine size, such particles being from a few microns to submicron size. This extends the usable range of the unit considerably for use in removing particle type impurities from gases.

In operation of the modification shown in FIG. 5, it is sometimes preferably to permit a buildup of cleansing liquid depth above the lower perforate plate 120 by varying the pressure in the swirl gas pocket 126. This is particularly true where it is desired to obtain a good chemical inter-reaction between the impurities in the gas and the cleansing liquid solution.

In summary, gases passed through the gas purifier unit are scrubbed and the solid impurities, as well as any soluble gases therein, are dissolved and/or removed through contact with the cleansing liquid.

The structural configuration of both the baffle structure and the lower section of the gas purifier unit is such that particles of impurities or precipitate tend to congregate toward the middle of the unit and to settle downwardly and to accumulate at the central drain openings. In some instances, lighter materials may be separated out of the impure gases and float along the top of the body of cleansing liquid. In such instances, the lighter material can be skimmed off the top surface of the upper body of cleansing liquid.

The preferred physical characteristics of the unit include ⅛ inch diameter holes in the baffle plate which are spaced about two diameters apart, and an angle of inclination of the gas bubble streams with the vertical of approximately 45°. It should be noted that the gas pocket brings about a stabilizing action in operation in that increased gas pressures will not upset the balance, but will raise the height of the upper body of cleansing fluid to compensate partially for the increased pressure. Because of the movement of the liquid and the downwardly sloping perforate plate 22 the solids entrapped by the cleansing liquid tend to settle inwardly toward the drain and conduit 26 and down to the cylindrical drain. Light impurities and soluble gases and solids will tend to accumulate at the top of the upper body of cleansing liquid Both the light and the heavy impurities can readily be removed.

While the invention has been described in connection with different embodiments thereof it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

What we claim is:

1. A gas purifier unit, comprising:
   a. an upright container having an opening adjacent the top thereof through which purified gas is withdrawn,
   b. separator means disposed cross-sectionally in the container with its periphery in sealed contact with the inner surface thereof for dividing the container into separate upper and lower sections and for supporting thereon in the upper section a body of liquid,
   c. the separator means including a perforated plate having many small openings disposed about a large central drain opening toward which the plate surface is downwardly inclined,
   d. the lower portion of the container including reservoir means for holding a lower body of liquid below and spaced from the bottom of the perforated plate,
   e. a connecting tube having its top edge integral with the perforated plate adjacent the opening and being of sufficient length to extend substantially below the upper surface of the lower body of liquid permitting impurities to settle downwardly therethrough,
   f. gas supply means having an outlet below the perforated plate for supplying impure gases at a pressure and velocity sufficient to sustain a gas pocket below the perforated plate and to also pass continuous streams of gas through the perforated plate and the upper body of fluid,
   g. the perforated plate having deflecting means associated with the openings therethrough for imparting a common angular direction to the streams of gas as they pass through the fluid to lengthen their path of travel therethrough and to impart rotary movement to the upper body of fluid around the drain opening through the perforated plate.

2. The gas purifier unit as set forth in claim 1, wherein:
   a. the upper and lower sections of the fluid container respectively contain upper and lower bodies of liquid,
   b. the upper body of liquid being at least one-half inch in depth,
   c. the small openings in the perforated plate being approximately one-eighth of an inch in diameter,
   d. the gas supply means supplies gas at a pressure sufficient to maintain the pressure in the gas pocket equal to the pressure of the upper body of fluid on the perforated plate.

3. The gas purifier unit as set forth in claim 1, wherein:

a. a second perforate plate member is spaced below the first perforate plate and above the impure gas supply means outlet,
b. the second perforate plate having a downwardly inclined surface sloping toward a central opening through which the conduit member extends,
c. a second downwardly extending conduit member integral with the second perforate plate at the periphery of its opening and disposed concentrically with respect to the first conduit member and extending into the lower body of liquid,
d. the second perforate plate having deflecting means associated therewith for imparting a direction to the gas streams which is opposite to the direction imparted by the deflecting means of the first perforate plate.

4. The gas purifier unit of claim 1, wherein:
a. the gas openings are approximately 1/8 inch in diameter and are spaced apart approximately twice their diameter, whereby the upper body of cleansing liquid is supported on the plate surface and the pressure of the gas coming through the gas stream openings.

5. The gas purifier unit of claim 1, wherein:
a. the gas streams leaving the perforate plate make an angle of approximately 45° with the top surface of the baffle and gas pocket means as they leave the gas openings.

6. The gas purifier unit as set forth in claim 1, wherein:
a. the fluid container is circular in shape; and
b. the baffle and gas pocket assembly is disc-shaped and the connecting passage is disposed at the center thereof.

7. The gas purifier unit as set forth in claim 1, wherein:
a. the fluid container is circular in cross-section;
b. the baffle and gas pocket assembly is a funnel-shaped member having a plurality of closely spaced gas openings in the conical surface; and
c. deflector pieces are disposed adjacent each of said openings for directing the gas streams in the same direction to impart movement to the upper body of liquid.

8. The gas purifier unit as set forth in claim 1, wherein:
a. the gas openings in the top surface of the baffle and gas pocket assembly are small openings which are spaced apart a distance about twice their size.

9. The gas purifier unit as set forth in claim 1, wherein:
a. the baffle and gas pocket assembly includes two spaced cross-sectionally disposed plates having a plurality of gas openings therethrough; and
b. the openings in each of said plates having a directing means associated therewith for directing the gas passing through the lower plate in one direction, and for directing the gas passing through the gas openings in the upper plate in the opposite direction.

10. The gas purifier unit as set forth in claim 1, wherein:
a. the bottom of the surface of the container has a plurality of upstanding stabilizer plates in contact with the lower body of liquid facing transversely to the line of movement of the fluid to retard movement thereof.

11. The gas purifier unit of claim 1, wherein:
a. the perforate plate surface makes a 15° angle approximately with the horizontal.

* * * * *